(12) United States Patent
Mizoguchi

(10) Patent No.: US 6,523,763 B1
(45) Date of Patent: Feb. 25, 2003

(54) PROCESS FOR PRODUCING THERMOPLASTIC RESIN GRANULES

(75) Inventor: Chuichi Mizoguchi, Tokyo (JP)

(73) Assignee: Hosakawa Micron Corporation, Osaka (JP)

(*) Notice: Subject to any disclaimer, the term of this patent is extended or adjusted under 35 U.S.C. 154(b) by 0 days.

(21) Appl. No.: 09/720,253

(22) PCT Filed: May 24, 2000

(86) PCT No.: PCT/JP00/03339

§ 371 (c)(1),
(2), (4) Date: Jan. 8, 2001

(87) PCT Pub. No.: WO00/71610

PCT Pub. Date: Nov. 30, 2000

(30) Foreign Application Priority Data

May 24, 1999 (JP) .......................................... 11-142593

(51) Int. Cl.$^7$ .............................................. B02C 19/12
(52) U.S. Cl. .............................................. 241/3; 241/23
(58) Field of Search ....................................... 241/23, 3

(56) References Cited

FOREIGN PATENT DOCUMENTS

| EP | 0 844270 A1 | * | 5/1998 |
|---|---|---|---|
| JP | 40-3526 | | 2/1940 |
| JP | 58-219932 | | 12/1983 |
| JP | 63-17918 | | 1/1988 |
| JP | 4-258638 | | 9/1992 |
| JP | 4-301409 | | 10/1992 |
| JP | 5-17583 | | 1/1993 |
| JP | 5-222205 | | 8/1993 |
| JP | 6-306178 | | 11/1994 |
| JP | 7-290446 | | 11/1995 |
| JP | 10113557 | | 5/1998 |
| JP | 10-204184 | | 8/1998 |
| JP | 2000-169592 | | 6/2000 |

* cited by examiner

Primary Examiner—Mark Rosenbaum
(74) Attorney, Agent, or Firm—Arent Fox Kintner Plotkin & Kahn, PLLC

(57) ABSTRACT

The present invention concerns a process for producing thermoplastic resin granules, comprising compression-molding a powdery raw material of a thermoplastic resin, which is obtained by polymerizing a plurality of materials and then drying the obtained polymer by passing the powdery raw material between two rolls arranged parallel with a minute gap therebetween at a temperature of 40° C. or higher, and crushing the obtained compression-molded product into granules having grain diameter of 10 mm or less, wherein concavities are formed all around the rolls so as to be arrayed in a direction inclined relative to axes of the rolls, the concavities each having an elliptical opening of which a major-axis diameter measures 10 mm or less.

1 Claim, 4 Drawing Sheets

| TEMPERATURE (°C) OF POWDERY RAW MATERIAL OF RESIN | 25 | 50 | 75 | 100 |
|---|---|---|---|---|
| BULK DENSITY (g/cc) OF GRANULES (GRAIN DIAMETERS 3 TO 5 mm) | 0.32 | 0.38 | 0.42 | 0.45 |

| TEMPERATURE (°C) OF POWDERY RAW MATERIAL OF RESIN | 25 | 100 |
|---|---|---|
| CRUSH STRENGTH (kg) OF PRODUCT | 14 | 95 |
| BULK DENSITY (g/cc) OF PRODUCT | 0.70 | 0.81 |

US 6,523,763 B1

PROCESS FOR PRODUCING THERMOPLASTIC RESIN GRANULES

TECHNICAL FIELD

The present invention relates to a process for producing thermoplastic resin granules to be supplied to a granulating machine or secondary molding machine.

BACKGROUND ART

In the production process of a thermoplastic resin, a powdery raw material of the thermoplastic resin, which is obtained by polymerizing a plurality of materials and then drying the obtained polymer, is cooled, is then mixed with an auxiliary material such as a plasticizer or another resin material, and is then granulated by a screw extruder into pellets having grain diameters of approximately 10 mm or less. The thus obtained pellets are supplied to a secondary molding machine such as an injection molding machine or blow molding machine so as to be molded into the shape of an end product.

The powdery raw material of a thermoplastic resin just after drying and cooling as described above has a low bulk density, and thus requires unduly large pieces of equipment for its transportation and storage. Moreover, in a screw extruder, the low bulk density of the powdery raw material incurs not only large slippage between the screw and the casing thereof but also a large compression ratio, which leads to unduly high power consumption by the screw extruder when it is driven.

These inconveniences can be alleviated by first compression-molding the powdery raw material into flakes by passing it between two rolls arranged parallel with a minute gap therebetween, and then crushing the obtained flakes into granules having grain diameters of 10 mm or less.

However, the thus obtained granules do not have a satisfactorily high bulk density, and thus they do not offer desired mechanical strength.

Moreover, attempting to produce granules having uniform grain sizes within a narrow range results in low yields.

DISCLOSURE OF THE INVENTION

A first object of the present invention is to provide thermoplastic resin granules having a satisfactorily high bulk density.

A second object of the present invention is to efficiently provide thermoplastic resin granules having satisfactorily uniform grain sizes.

To achieve the above objects, according to a first aspect of the present invention, a process for producing thermoplastic resin granules includes compression-molding a powdery raw material of a thermoplastic resin, which is obtained by polymerizing a plurality of materials and then drying the obtained polymer, by passing the powdery raw material between two rolls arranged parallel with a minute gap therebetween at a temperature of 40° C. or higher, and crushing the obtained compression-molded product into granules having grain diameters of 10 mm or less.

According to a second aspect of the present invention, a process for producing thermoplastic resin granules includes mixing a powdery raw material of a thermoplastic resin, which is obtained by polymerizing a plurality of materials and then drying the obtained polymer, with an auxiliary material at a temperature of 40° C. or higher, compression-molding the powdery raw material by passing the powdery raw material between two rolls arranged parallel with a minute gap therebetween, and crushing the obtained compression-molded product into granules having grain diameters of 10 mm or less.

According to a third aspect of the present invention, in the process for producing thermoplastic resin granules of the first or second aspect of the present invention, the rolls each have a large number of identically shaped and identically sized concavities formed all over the outer circumferential surface thereof. Here, the concavities each have an elliptical opening of which the major-axis diameter measures 10 mm or less and is aligned with the direction of the circumference of the outer circumferential surface of the roll. Moreover, the concavities each have a curved surface of which the section on a plane parallel to the direction of the circumference is arc-shaped. Furthermore, the concavities are arranged in such a way that the minimum distance between any two adjacent concavities is 0.5 mm or less and that a concavity in one roll faces a concavity in the other roll across the minimum gap between the two rolls.

According to a fourth aspect of the present invention, in the process for producing thermoplastic resin granules of the third aspect of the present invention, the minimum gap between the two rolls is 0.5 mm or more and 1.0 mm or less.

BEST MODE FOR CARRYING OUT THE INVENTION

Hereinafter, embodiments of the present invention will be described with reference to the drawings.

Figure 1:
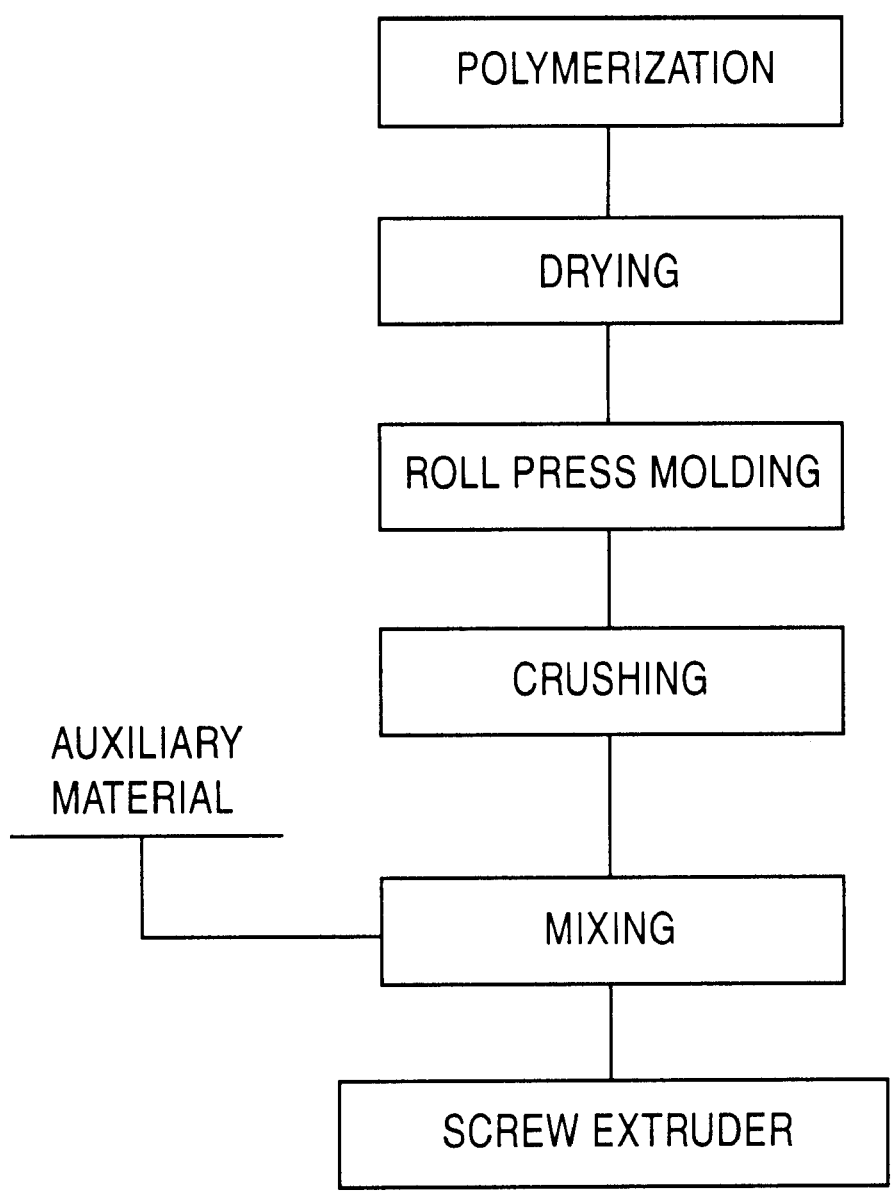
FIG. 1 is a block diagram of a thermoplastic resin pellet production process that incorporates a thermoplastic resin granule production process embodying the present invention.
Figure 2:
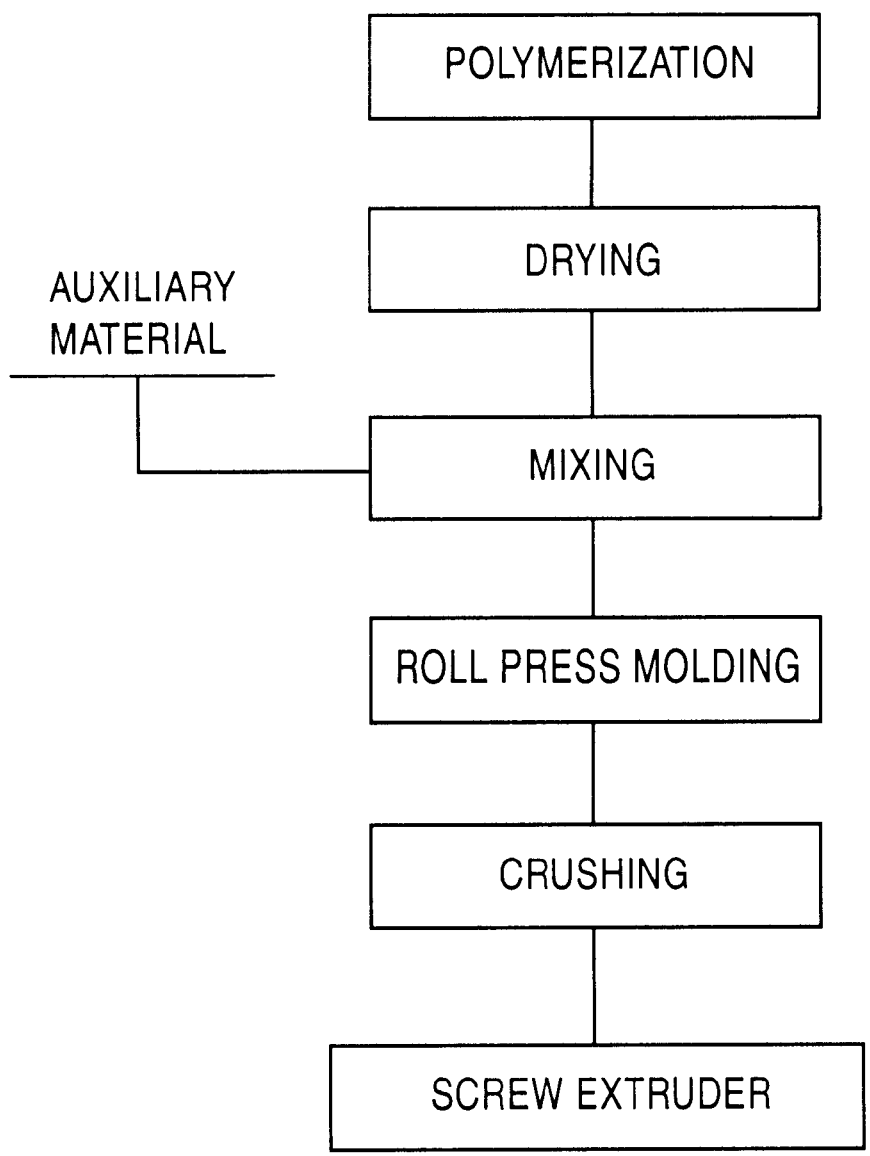
FIG. 2 is a block diagram of another thermoplastic resin pellet production process that incorporates a thermoplastic resin granule production process embodying the present invention.
Figure 3:
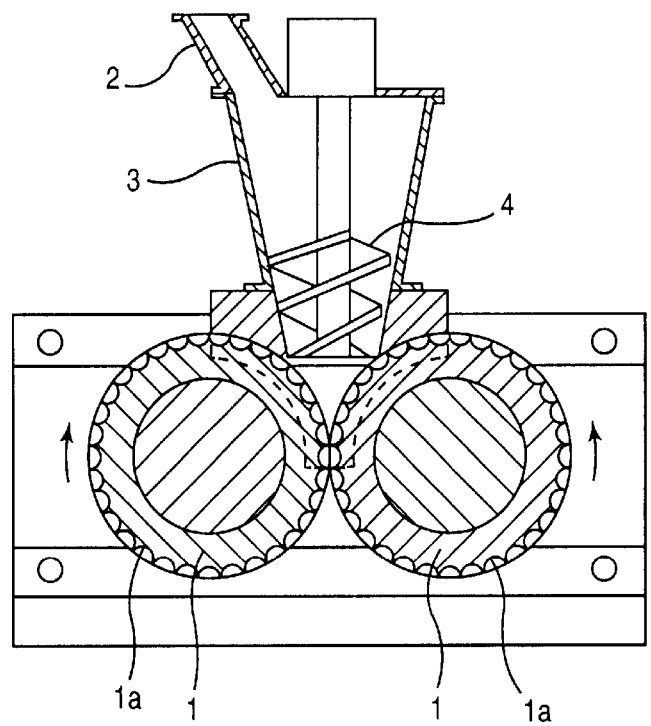
FIG. 3 is a sectional view, as seen from the front, of a roll press employed in the present invention.
Figure 4:
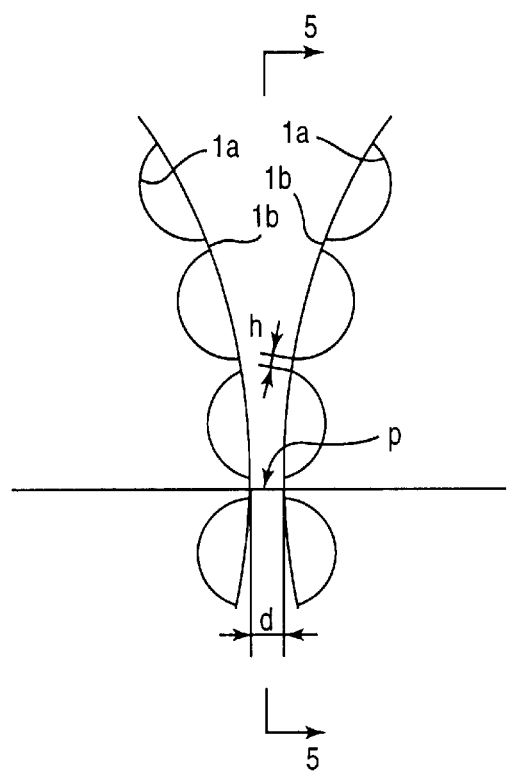
FIG. 4 is a detail view of a principal portion of FIG. 3.
Figures 5, 6, 7:
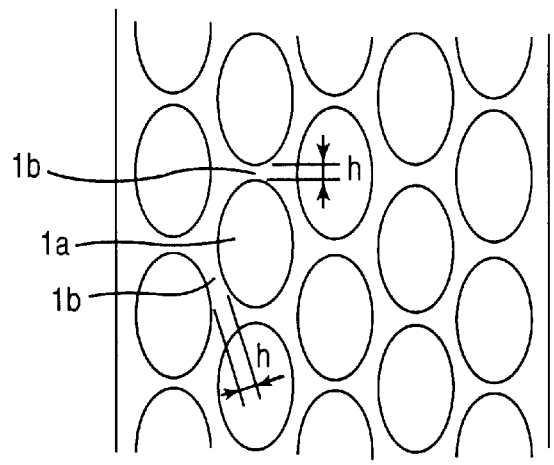
FIG. 5 is a different view of FIG. 4, as seen from the direction indicated by arrows 5 in FIG. 4.
FIG. 6 lists data showing the relationship between the temperature of the powdery raw material of polycarbonate and the bulk density of the thermoplastic resin granules obtained from that raw material.
FIG. 7 lists data showing the relationship between the temperature of the powdery raw material of polycarbonate and the crush strength and density of the compression-molded product obtained from that raw material.

FIGS. 1 and 2 are block diagrams of thermoplastic resin pellet production processes that incorporate a thermoplastic resin granule production process embodying the present invention. FIG. 3 is a sectional view, as seen from the front, of a roll press employed in the present invention. FIG. 4 is a detail view of a principal portion of FIG. 3. FIG. 5 is a different view of FIG. 4, as seen from the direction indicated by arrows 5 in FIG. 4.

In the thermoplastic resin pellet production process shown in FIG. 1, a powdery raw material of a thermoplastic resin, which is obtained by polymerizing a plurality of materials and then drying the obtained polymer, is compression-molded by being passed between two rolls arranged parallel with a minute gap therebetween without being cooled, specifically at a temperature of 40° C. or higher, and preferably 50° C. or higher. The obtained compression-molded product is then crushed into granules having grain diameters of 10 mm or less. The thus obtained granules are mixed with an auxiliary material and then supplied to a screw extruder so as to be granulated into pellets.

On the other hand, in the thermoplastic resin pellet production process shown in FIG. 2, a powdery raw material of a thermoplastic resin after polymerization and drying is mixed with an auxiliary material without being cooled, specifically at a temperature of 40° C. or higher, and preferably 50° C. or higher, and is then compression-molded by being passed between two rolls arranged parallel with a minute gap therebetween. The obtained compression-molded product is then crushed into granules having grain diameters of 10 mm or less. The thus obtained granules are supplied to a screw extruder so as to be granulated into pellets.

The thermoplastic resin used here may be of any kind, for example, polyethylene, polyethylene terephthalate, polystyrene, ABS resin, metacrylate resin, polyamide, polycarbonate, polyacetal, polyphenylene ether, polyphenylene sulfide, polyether ether ketone, polysulfone, fluororesin, polybutylene terephthalate, or the like.

The auxiliary material added here may be, for example, a plasticizer, stabilizer (polyvinyl chloride stabilizer, softening stabilizer, hardening stabilizer), flame retarder, antioxidant (oxidation inhibitor), ultraviolet ray absorbent, colorant, antistatic agent, reinforcer (glass fiber, carbon fiber, aramid fiber, boron fiber, synthetic fiber (vinylon, polyester)), filler (for the purpose of reinforcement, shielding, electric conduction, lubrication, absorption, anti-dripping, weather resistance, thermal expansion coefficient adjustment, improved printability or adhesiveness, extending, or other), or the like.

The obtained pellets are supplied to a secondary molding machine so as to be molded into the shape of an end product.

The secondary molding machine here may be, for example, a compression molding machine, calendering machine, extrusion molding machine, blow molding machine, vacuum or compressed-air molding machine, foaming machine, injection molding machine, or the like.

The granules may be supplied intact, i.e. without being granulated into pellets, to the secondary molding machine.

Since a thermoplastic resin becomes plastic at high temperatures, by compression-molding a powdery raw material thereof just after drying by passing it between rolls without cooling it, i.e. at a temperature of 40° C. or higher, it is possible to obtain granules having a high bulk density.

FIG. 6 shows the relationship between the bulk density of the obtained granules and the temperature of the powdery raw material when a powdery raw material of polycarbonate, having a bulk density of 0.21 g/cm² after polymerization and drying, is first compression-molded into 4 mm thick flakes by being passed between two rolls under compressive force of 4 t for every 1 cm width along the axes of the rolls, and is then crushed and sifted to obtain granules having grain diameters of 3 to 5 mm. FIG. 6 shows that, the higher the temperature of the powdery raw material, the higher the bulk density of the obtained granule.

When a highly heat-resistant thermoplastic resin such as a polyphenylene sulfide resin is used, at an ordinary temperature of 25° C., it is not possible to obtain a satisfactorily hard product under molding pressure of 1 t/cm², and thus the product does not stand the shock of pneumatic transportation and is smashed thereby. On the other hand, with the powdery raw material at 100° C. or higher, it is possible to obtain a satisfactorily hard product. Thus, the preferable temperature of the powdery raw material is 100° C. or higher.

FIG. 7 shows the data of the crush strength and density of the product obtained when a cylinder measuring 25 mm in diameter and 25 mm in height is filled with a powdery raw material of a polyphenylene sulfide resin and then the resin is compression-molded under pressure of 1 t/cm² applied thereto by a piston, separately for cases where the temperature of the powdery raw material is 25° C. and 100° C. respectively.

The rolls may have flat, smooth circumferential surfaces, or have fine grooves formed in the circumferential surfaces thereof along the axis or circumference thereof, or have undulate circumferential surfaces. The two rolls are arranged with a gap of about 2 to 5 mm therebetween. With a highly plastic resin, however, the crushed product has irregular shapes and very rugged cut surfaces, which often leads to an unexpectedly low bulk density. Moreover, the crushed product exhibits an unduly wide grain size distribution, and thus, to obtain granules having uniform grain sizes, the crushed product needs to be sifted so that granules having grain sizes larger than desired are crushed again and that granules having grain sizes smaller than desired are circulated so as to be compression-molded between the rolls and then crushed. This leads to low yields.

For these reasons, when a highly plastic resin is used, as shown in FIGS. 3 to 5, compression molding is performed using briquette rolls 1 and 1 that have a large number of equally shaped and equally sized concavities 1a, 1a, . . . formed all over the outer circumferential surfaces thereof, with the rolls arranged with a gap d of 0.5 mm or more and 1.0 mm or less therebetween. The concavities 1a, 1a, . . . are each so formed as to have an elliptical opening of which the major-axis diameter is 10 mm or less and is aligned with the direction of the circumference of the outer circumferential surfaces of the rolls 1, and are arranged in such a way that the concavities in one roll 1 face the concavities in the other roll 1 across the minimum gap d (see FIG. 4) between the rolls 1 and 1.

The concavities 1a formed on the outer circumferential surfaces of the rolls 1 and 1 help obtain the product in the form of a large number of briquettes connected together. This product is then crushed by a crushing machine that breaks it at the borders between briquettes, i.e. at the thin portions of the product that are formed by the round portions 1b of the outer circumferential surfaces of the rolls 1 where there are no concavities 1a, into separate briquettes. The thus obtained briquettes are not flat, but have smooth surfaces, and thus have a higher bulk density and better fluidity than irregularly-shaped granules obtained by crushing flakes as described earlier. This makes uniform discharge of the product from a hopper and uniform supply thereof to a screw extruder possible.

Here, since a powdery raw material of a thermoplastic resin is apt to exhibit high friction resistance against the outer circumferential surfaces of the rolls, the friction resistance occurring between the surfaces of the concavities 1a and the product at the position where the highest molding pressure is present (the position indicated by p in FIG. 4) tends to produce so strong shearing force as to cause cracks in and thus breakage of the product. To prevent this, the concavities 1a are each so formed as to have a curved surface of which the section on a plane parallel to the circumference of the outer circumference surfaces of the rolls 1 is arc-shaped. This permits the product to slip on the surfaces of the concavities 1a, and thereby prevents generation of unduly strong shearing force. To ensure that, when crushed, the product is broken at the borders between briquettes, the round portions 1b need to be made as small as possible. Specifically, the concavities 1a, 1a, . . . are arranged in such a way that the minimum distance h between any two adjacent concavities 1a and 1a is 0.5 mm or less.

To prevent unduly strong compressive force near the round portions 1b from causing cracks in briquettes, or breakage thereof that may cause broken briquettes to attach to the concavities 1a, the gap d between the rolls is made to be 0.5 mm or more. In addition, to prevent the round portions 1b from having so large a thickness as to permit briquettes to be broken somewhere other than at the thin portions, the gap d is made to be 1.0 mm or less.

The raw material charged into a hopper 3 through a raw material inlet 2 is then supplied by a screw 4 to between the rolls 1 and 1, where the raw material is compression-molded by the rolls 1 and 1 rotating as indicated by arrows. Here, at the position p where the rolls 1 and 1 have the minimum gap, the product slips on the surfaces of the concavities 1a, and thus it does not develop unduly strong shearing force inside itself. Moreover, since the round portions 1b between the concavities 1a and 1a are small, the product is obtained in the form of a large number of briquettes connected together by thin portions. When crushed, the product is broken at the thin portions into separate briquettes.

As one example, a powdery raw material of a polyphenylene sulfide resin after polymerization and drying was compression-molded into flakes by being passed between a pair of rolls arranged parallel with a gap of 4 mm therebetween and having flat, smooth outer circumferential surface at a high temperature of 75° C. under compressive force of 4 t for every 1 cm width along the axes of the rolls. The obtained flakes were crushed and sifted to obtain irregularly-shaped granules having grain diameters of 3 to 5 mm. The bulk density of the thus obtained granules was 0.42 g/cc.

As another example, the same material was compression-molded into a product in the form of a large number of briquettes connected together by being passed, at the same temperature and under compressive force of 4 t/cm, between a pair of rolls arranged parallel with a gap of 1 mm therebetween and having a large number of concavities 1a, 1a, . . . formed in the outer circumference surfaces thereof, with the concavities measuring 5 mm in major-axis diameter along the direction of the circumference of the rolls, 4 mm in minor-axis diameter along the direction of the axis of the rolls, and 1.5 mm in depth and arranged in such a way that the minimum distance between any two adjacent concavities 1a and 1a is 0.3 mm. The obtained product was crushed to obtain granules in the form of separate briquettes measuring 5 mm in length, 4 mm in width, and 4 mm in thickness. The bulk density of the thus obtained granules was 0.56 g/cc.

In an attempt to produce granules having comparatively uniform grain diameters of 4 to 6 mm, a powdery raw material was compression-molded into flakes by being passed between rolls having flat, smooth outer circumferential surfaces, and then the obtained flakes were crushed and sifted so that granules having grain diameters of 4 to 6 mm were collected, that granules having grain diameters larger than 6 mm were crushed again, and that granules having grain diameters smaller than 4 mm were circulated so as to be compression-molded again. This attempt resulted in a yield of about 30%. By contrast, in another attempt to the same effect, the powdery raw material was compression-molded into briquettes measuring 6 mm in length, 4.5 mm in width, and 4.5 mm in thickness by being passed between rolls having concavities, measuring 6 mm in major-axis diameter and 4 mm in minor-axis diameter, formed in the outer circumferential surfaces thereof, and then the obtained briquettes were sifted with a sieve having 4 mm meshes so as to remove small burrs between briquettes and fine particles that have escaped through the gaps at both sides of the rolls. This attempt resulted in a yield of 90% or more.

Obviously, many modifications and variations of the present invention are possible in light of the above teachings. It is therefore to be understood that within the scope of the appended claims, the invention may be practiced other than as specifically described.

Industrial Applicability

As described above, by a thermoplastic resin granule production process embodying the present invention, it is possible to obtain thermoplastic resin granules having a high bulk density, and thereby reduce the sizes of pieces of equipment for its transportation and storage, and in addition reduce the power consumption by a screw extruder.

In particular, by the thermoplastic resin granule production process even with a highly plastic thermoplastic resin, it is possible to permit, during compression molding, the product to slip on the surfaces of concavities, and thus prevent generation of unduly strong shearing force in the product and thereby reduce development of cracks therein. Moreover, since the distances between adjacent concavities are small, it is possible to make the portions connecting briquettes together so thin as to reduce the possibility of briquettes themselves being broken when the product is crushed. Furthermore, it is possible to efficiently obtain thermoplastic resin granules having uniform grain sizes.

By the thermoplastic resin granule production process it is possible to reduce the possibility of unduly strong compressive force causing cracks in briquettes, or breakage thereof that may cause broken briquettes to attach to concavities, and in addition further reduce the possibility of briquettes themselves being broken when the product is crushed.

What is claimed is:

1. A process for producing thermoplastic resin granules, comprising compression-molding a powdery raw material of a thermoplastic resin, which is obtained by polymerizing a plurality of materials and then drying the obtained polymer, by passing the powdery raw material between two rolls arranged parallel with a minute gap therebetween at a temperature of 40° C. or higher, and crushing the obtained compression-molded product into granules having grain diameter of 10 mm or less, wherein concavities are formed all around the rolls so as to be arrayed in a direction inclined relative to axes of the rolls, the concavities each having an elliptical opening of which a major-axis diameter measures 10 mm or less.

* * * * *